US011667589B2

(12) United States Patent
Buzruk et al.

(10) Patent No.: US 11,667,589 B2
(45) Date of Patent: *Jun. 6, 2023

(54) COMPOSTING DEVICE WITH TRIM BEZEL

(71) Applicant: WHIRLPOOL CORPORATION, Benton Harbor, MI (US)

(72) Inventors: Abhishek P. Buzruk, Maharashtra (IN); Christopher C. Wilcox, Stevensville, MI (US); Michael S. Seeley, South Haven, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 260 days.

This patent is subject to a terminal disclaimer.

(21) Appl. No.: 17/071,503

(22) Filed: Oct. 15, 2020

(65) Prior Publication Data

US 2021/0024432 A1     Jan. 28, 2021

Related U.S. Application Data

(63) Continuation of application No. 16/690,326, filed on Nov. 21, 2019, now Pat. No. 10,822,289, which is a continuation of application No. 15/158,958, filed on May 19, 2016, now Pat. No. 10,501,381.

(51) Int. Cl.
*C05F 17/907* (2020.01)
*C05F 17/964* (2020.01)

(52) U.S. Cl.
CPC .......... *C05F 17/907* (2020.01); *C05F 17/964* (2020.01); *Y02P 20/145* (2015.11); *Y02W 30/40* (2015.05)

(58) Field of Classification Search
CPC ............................ C05F 17/907; C05F 17/964
See application file for complete search history.

(56) References Cited

U.S. PATENT DOCUMENTS

| 4,753,367 | A | 6/1988 | Miller et al. |
| 5,535,913 | A | 7/1996 | Asbach et al. |
| 6,276,621 | B1 | 8/2001 | Henry |
| 6,431,744 | B1 | 8/2002 | Ash et al. |
| 8,298,312 | B2 | 10/2012 | Cruson et al. |
| 10,035,734 | B2 | 7/2018 | Koh |
| 2011/0281345 | A1 | 11/2011 | Bell |
| 2013/0217111 | A1 | 8/2013 | Chang |
| 2013/0248532 | A1 | 9/2013 | Yang et al. |

(Continued)

FOREIGN PATENT DOCUMENTS

| JP | 3097639 B2 | 10/2000 |
| JP | 2005152683 A | 6/2005 |

(Continued)

OTHER PUBLICATIONS

European Search Report for Counterpart EP17159965.7, dated Oct. 11, 2017.

*Primary Examiner* — William H. Beisner
*Assistant Examiner* — Danielle B Henkel
(74) *Attorney, Agent, or Firm* — McGarry Bair PC

(57) ABSTRACT

The disclosure relates to a composting device including a housing defining an interior, and having a top wall defining an access opening providing access to the interior, a door moveable relative to the access opening between open/closed positions to selectively open/close the access opening, a trim bezel with a trim bezel opening, and a bin located within the interior and having a fill opening in communication with the trim bezel opening.

19 Claims, 5 Drawing Sheets

(56) References Cited

U.S. PATENT DOCUMENTS

2015/0031123 A1  1/2015  Delgado et al.
2017/0260108 A1  9/2017  Koh

FOREIGN PATENT DOCUMENTS

| KR | 100710028 B1 | 4/2007 |
| KR | 20090075306 A | 7/2009 |
| KR | 20100025519 A | 3/2010 |
| WO | 2008150059 A1 | 12/2008 |
| WO | 2010090537 A2 | 8/2010 |

COMPOSTING DEVICE WITH TRIM BEZEL

CROSS REFERENCE TO RELATED APPLICATIONS

This application is a continuation of U.S. patent application Ser. No. 16/690,326, filed Nov. 21, 2019, now U.S. Pat. No. 10,822,289, issued Nov. 3, 2020, which is a continuation of U.S. patent application Ser. No. 15/158,958, filed May 19, 2016, now U.S. Pat. No. 10,501,381, issued Dec. 10, 2019, both of which are incorporated herein in their entirety.

BACKGROUND

Composting devices are known to implement a composting cycle for biologically and chemically decomposing organic material, such as food waste, into compost for use as a fertilizer and soil amendment. The composting cycle can be implemented in a composting bin by providing water, heat and aeration to the refuse, and can require a period of time for completion.

When organic material is introduced into the composting device through a door, it is desirable to keep areas surrounding the door free from food debris to prevent undesirable lodging of food debris in hard to clean areas. Including parts that are easy to clean and prevent lodging of food in inaccessible areas can benefit the user and lengthen the lifetime of the composting device.

BRIEF SUMMARY

In one aspect, a food composter a housing defining an interior, and having a top wall defining an access opening providing access to the interior; a door moveable relative to the access opening between open/closed positions to selectively open/close the access opening; a trim bezel comprising a vertical portion and having a trim bezel opening aligned with the access opening; and a bin located within the interior and having a fill opening in communication with the trim bezel opening.

In another aspect, a food composter comprising a housing defining an interior and having an end wall having an access opening providing access to the interior; a door moveable relative to the access opening between open/closed positions to selectively open/close the access opening; a trim bezel having a trim bezel opening aligned with the access opening; and a bin located within the interior and having a fill opening in communication with the trim bezel opening.

DETAILED DESCRIPTION

Figure 1:
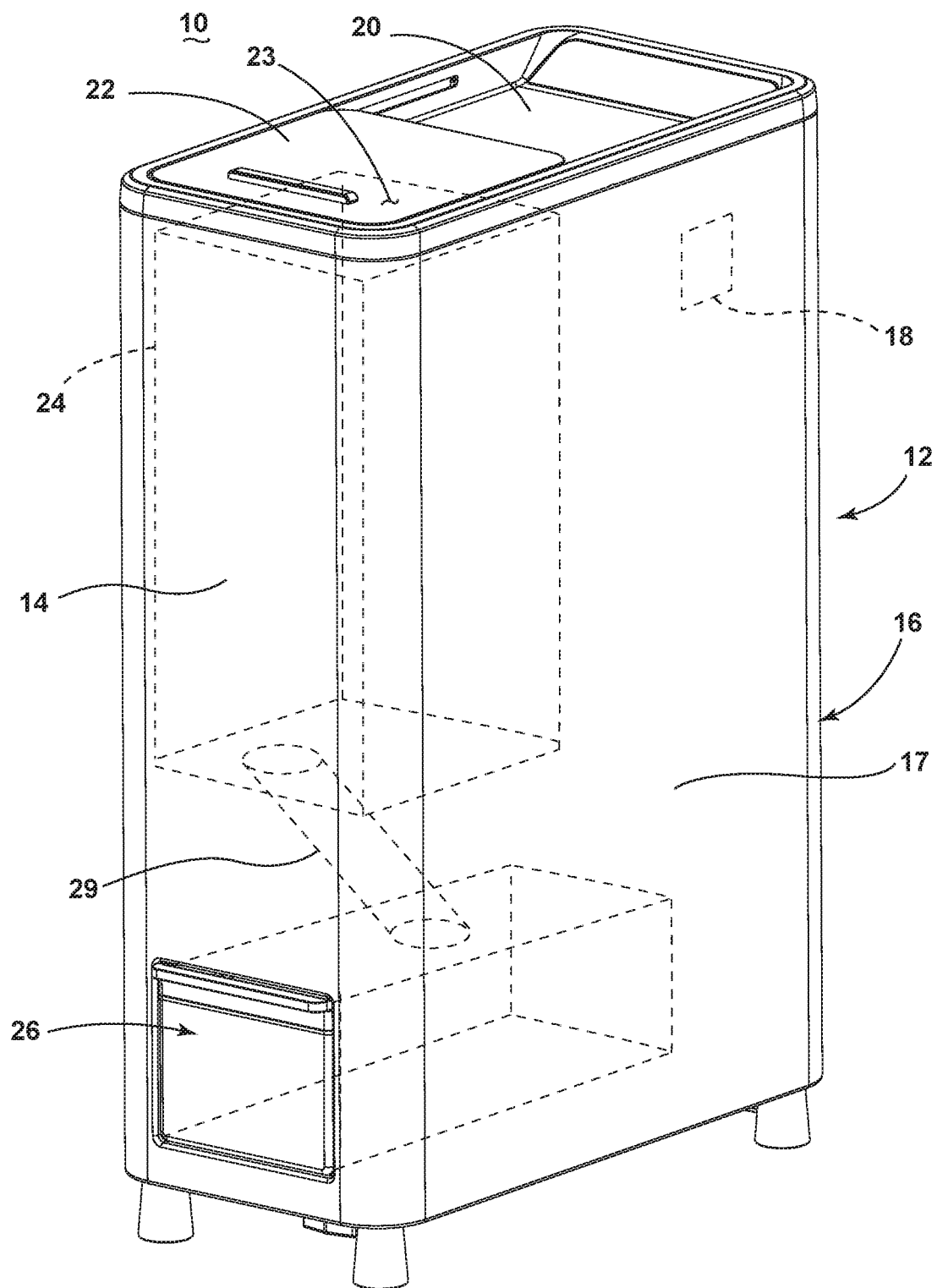
FIG. 1 is a perspective view of a composting device.

FIG. 1 illustrates a perspective view of a composting device 10 or a food recycler oriented in the vertical direction for transforming organic material into compost by way of a composting cycle of operation. The composting device 10 can include a housing 12 defining an interior having a front wall 14 spaced from a back wall 16, a pair of side walls 17, and a controller 18 located within the housing 12.

A top wall 20 can enclose the housing 12 at the top of the front wall 14, back wall 16, and the pair of side walls 17. The housing 12 can be any structure for enclosing, supporting and protecting the electrical and mechanical components of the composting device 10 including, but not limited to a cabinet with a frame.

The housing 12 further comprises a lid assembly 28 which can include the top wall 20 and a door 22 slidably mounted to the housing 12 for sliding movement between open or closed positions to enable access to the interior of the composting device 10. The door 22 can be any barrier that provides selective access for inputting organic material into the composting device 10, including, but not limited to a hingedly, slidably or removably mounted cover, drawer, panel or lid. While shown in FIG. 1 as coupled to the top wall 20, the door 22 can be mounted to any exterior wall enclosing the housing 12 including, but not limited to the front wall 14.

The top wall 20, as well as the remainder of the housing 12, can be formed of any material suitable for construction of the housing structure including, but not limited to metal such as steel or steel alloy, plastic, composite materials such as a hardened polymer composite material or combinations thereof. Some models of composting devices 10 can include decorative panels that can be integral with or mounted on the housing 12 or one or more walls.

When in the open position, the door 22 provides access to the interior of the housing 12. In the open position, the door can further expose any element of the composting device 10 interior of the housing 12 including but not limited to one or more water fill inlets for supplying water to the composting device 10 and one or more enzyme dispenser inlets. A composter bin 24 is provided within the housing 12 and includes a fill opening 23. The composter bin 24 can be disposed beneath the door 22 such that the door provides selective access to the fill opening 23 as the door is moved to the open position.

An access drawer 26 is provided and slides in or out through an opening in the front wall 14. The access drawer 26 is a drawer slidably mounted to the housing 12 on a horizontal axis for movement between open and closed positions. It will be understood, however, that access to the interior of the composting device 10 via the front wall 14 can be provided in other ways, including but not limited to, a door pivotally connected to the front wall 14. The access drawer can be detachably mounted to an internal side of the housing 12 and is accessible from outside the housing 12. The access drawer 26 can be removable from the interior of the housing 12 so that the contents thereof can be discharged at will by a user, as for example, by dumping the contents of the drawer 26 onto a garden.

Operation of the composting device 10 can be conventional and is not critical to the embodiments disclosed herein. For example, a conduit 29 can extend from the composter bin 24, such as from a lower portion of the composter bin 24, toward the access drawer 26. Embodiments of the disclosure can optionally include a transfer mechanism disposed inside the conduit 29 capable of assisting the transfer of material from the composter bin 24 to the access drawer 26. Examples of a transfer mechanism can include, but are not limited to, a rotatable auger, a conveyor, a gravitational chute, and the like.

A complete cycle of operation can include receiving organic material into the composter bin 24, mixing the organic material within the composter bin 24 while simultaneously drying the organic material and then transferring the organic material to the access drawer 26 after which the composted organic material can be removed. A more complete exemplary description of the mechanisms involved in a complete cycle of operation for the composting device 10 can be found in U.S. application Ser. No. 15/064,969, now U.S. Pat. No. 10,000,429, which is incorporated by reference.

Figure 2:
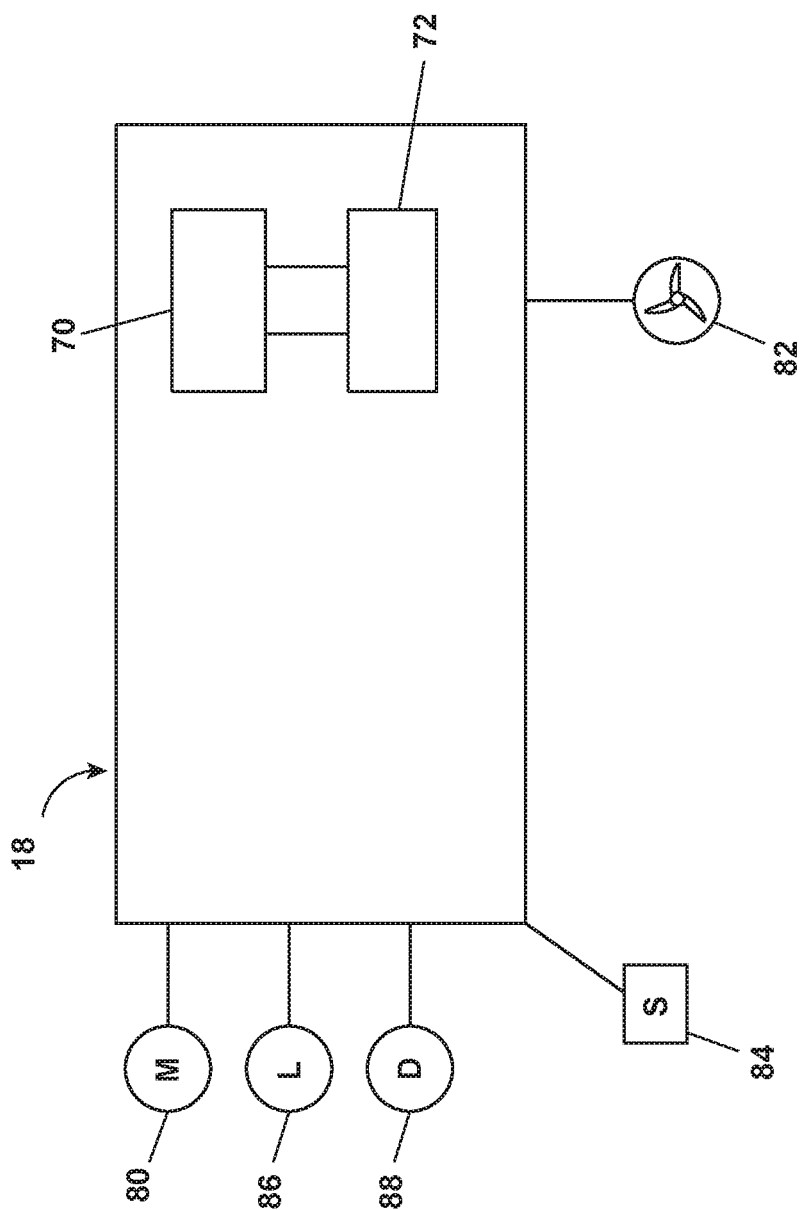
FIG. 2 is a block diagram of a control system of the composting device.

Referring now to FIG. 2, a schematic of the controller 18 for controlling the operation of the composting device 10 is illustrated. The controller 18 can be provided with a memory 70 and a central processing unit (CPU) 72. The memory 70 can be used for storing the control software that is executed by the CPU 72 in completing a cycle of operation using the composting device 10 and any additional software. The memory 70 can also be used to store information, such as a database or table, and to store data received from one or more components of the composting device 10 that can be communicably coupled with the controller 18.

The controller 18 can be operably coupled with one or more components of the composting device 10 for communicating with and controlling the operation of the component to complete a cycle of operation. For example, the controller 18 can be operably coupled with a motor 80 to control the operation of the motor 80. In another example, the controller 18 can be operably coupled to a fan 82. The controller 18 can also be coupled with one or more sensors 84 provided in one or more of the systems of the composting device 10 to receive input from other sensors in the composting device 10. The controller 18 can also be operably coupled to a lid switch 86 to control locking a lid lock 90 (FIG. 3) within the composting device 10 when in operation and unlocking the composting device 10 when a cycle has completed. The controller can be operably coupled to a door closing switch 88 to provide an automatic closing of the door 22.

Figure 3:
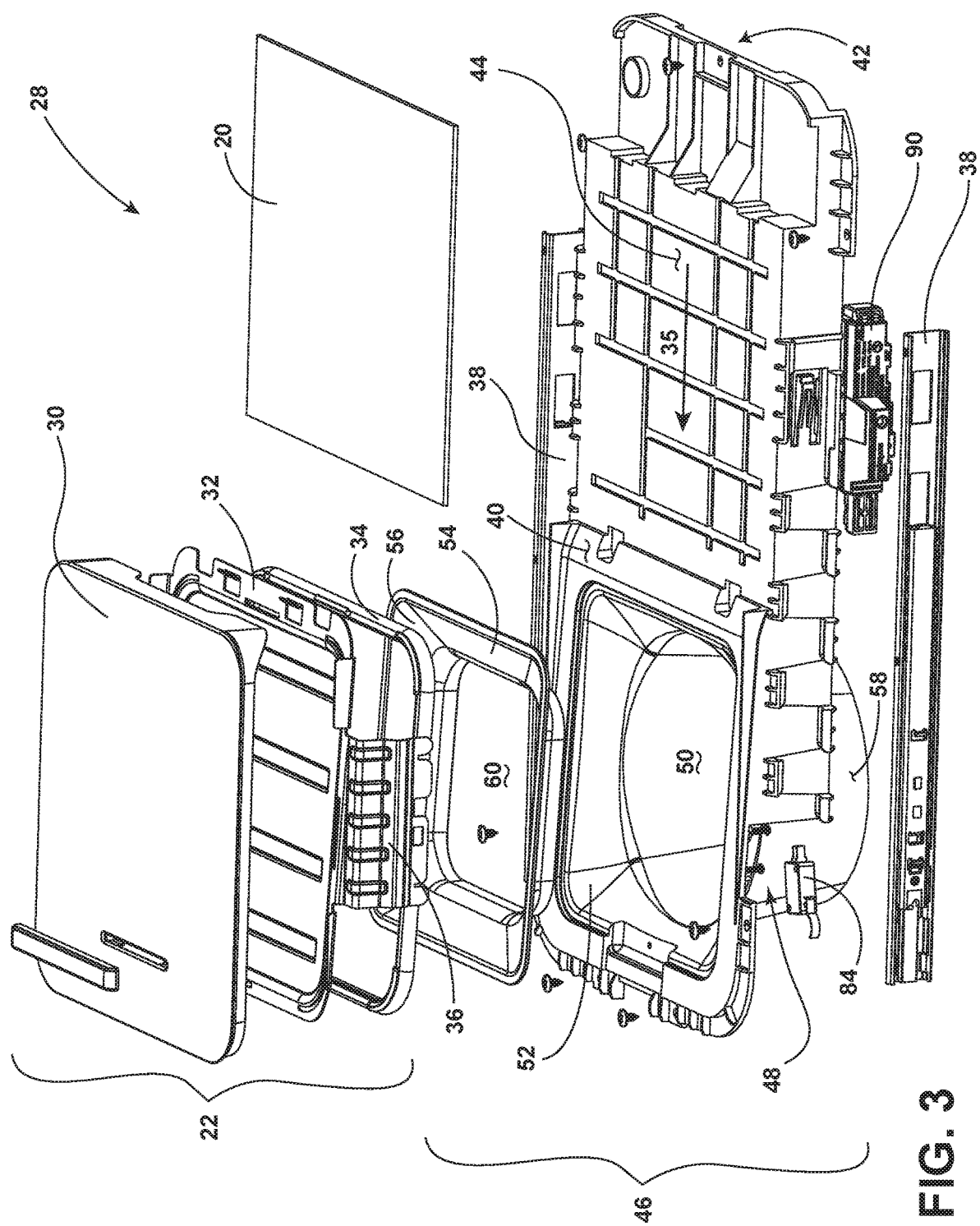
FIG. 3 is an exploded view of a lid assembly of the composting device.

FIG. 3 details the components of the lid assembly 28 of the composting device 10 in an exploded view. The lid assembly 28 is provided on top of the housing 12 for the composting device 10 such that when the door 22 is in an open position it provides direct access to the fill opening 23 of the composting bin 24. The door 22 can comprise three parts, a fascia 30, a carriage 32, and a seal 34. The fascia 30 can overly and be mounted to at least a portion of the carriage 32. The carriage 32 can include a track coupler 36 formed to be slidably mounted to slide rails 38 that can be any form of rail system including but not limited to dovetail slides, compound slides, and rack slides having friction bearing, ball bearing, or roller bearings.

The seal 34 is further mounted to the carriage 32 wherein when the door 22 is slid closed along a sliding path 35 the seal 34 comes in contact with a sealing surface 40. In one implementation, the seal 34 is compressible and complementary in orientation to the sealing surface 40 where the seal 34, the sealing surface 40 or both the seal and the sealing surface 40 are coated in an anti-friction coating.

The lid assembly 28 further includes a removable end plate 42 comprising a barrier portion 44 and a funnel assembly 46 comprising a funnel 48 and removable trim bezel 54. The funnel assembly 46 defines an access opening 50 providing communication with the fill opening 23 of the composter bin 24. The sealing surface 40 extends about the access opening 50 and, in some configurations, defines the access opening 50.

The funnel 48 can further comprise a converging portion 52 where the converging portion 52 can have a rectilinear perimeter. It can be contemplated that the perimeter and shape of the converging portion 52 can be any shape formed to receive a removable trim bezel 54 having a complimentary converging portion 56. The funnel 48 can further include a tube 58 defining a portion of the access opening 50 wherein the tube 58 can have a differing shape than the converging portion 52. For example as illustrated, the tube 58 is a circular shape while the converging portion is rectilinear. It should be understood that this shape configuration is not limiting and that the converging portion 52 and the tube 58 can be formed in other shape configurations, including wherein they share the same shape.

The trim bezel 54 can be placed on the funnel 48 and can be flush with the sealing surface 40 when in place. The trim bezel 54 can overlie a part of the converging portion 52 including the entire funnel 48. The trim bezel 54 can surround the access opening 50 such that when in place access to the fill opening 23 via the access opening 50 is available through a trim bezel opening 60.

Figure 4:
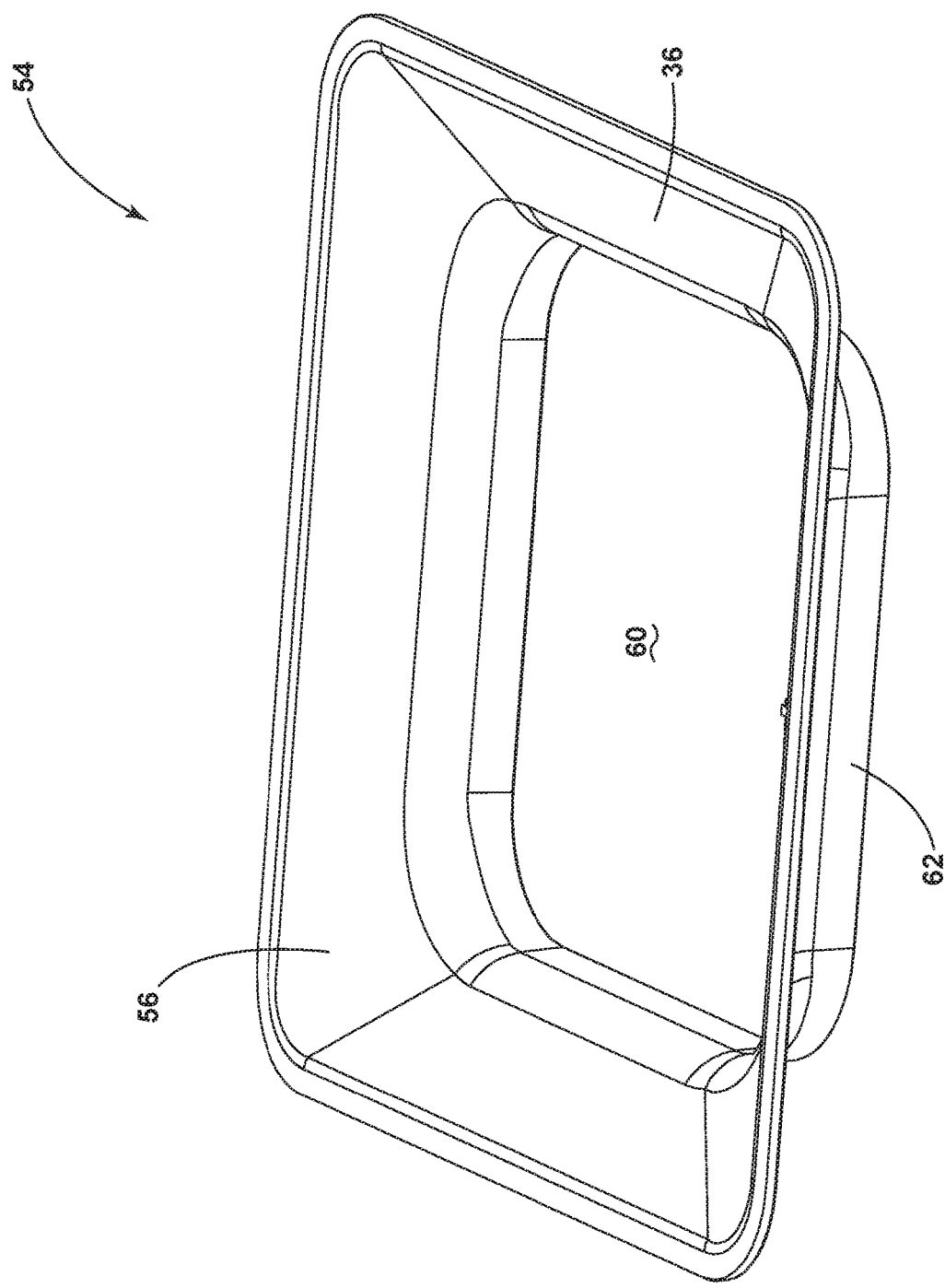
FIG. 4 is a detailed view of a portion of the lid assembly.

The trim bezel 54 illustrated in perspective view in FIG. 4 is formed from a dishwasher-safe material, for example but not limited to polyoxymethylene, acrylonitrile butadiene styrene, melamine, nylon, polypropylene, or silicone, such that it retains its shape after being exposed to temperatures greater than 65° C. for at least 180 minutes.

The trim bezel 54 includes the complimentary converging portion 56 that converges and ties into a smaller rectilinear vertical portion 62 with smooth curves to effectively allow food debris to move into the access opening 50. While illustrated as a rectilinear vertical portion 62, the portion 62 of the trim bezel 54 can be formed in other shapes including but not limited to a circular shape wherein the portion 62 fits within and is smaller than the access opening 50 provided by the tube 58. The dishwasher-safe material can also have a static friction coefficient of less than 0.3 using the ASTM D1894 coefficient of friction testing method to further aid in the distribution of food debris through the trim bezel opening 60.

Figure 5:
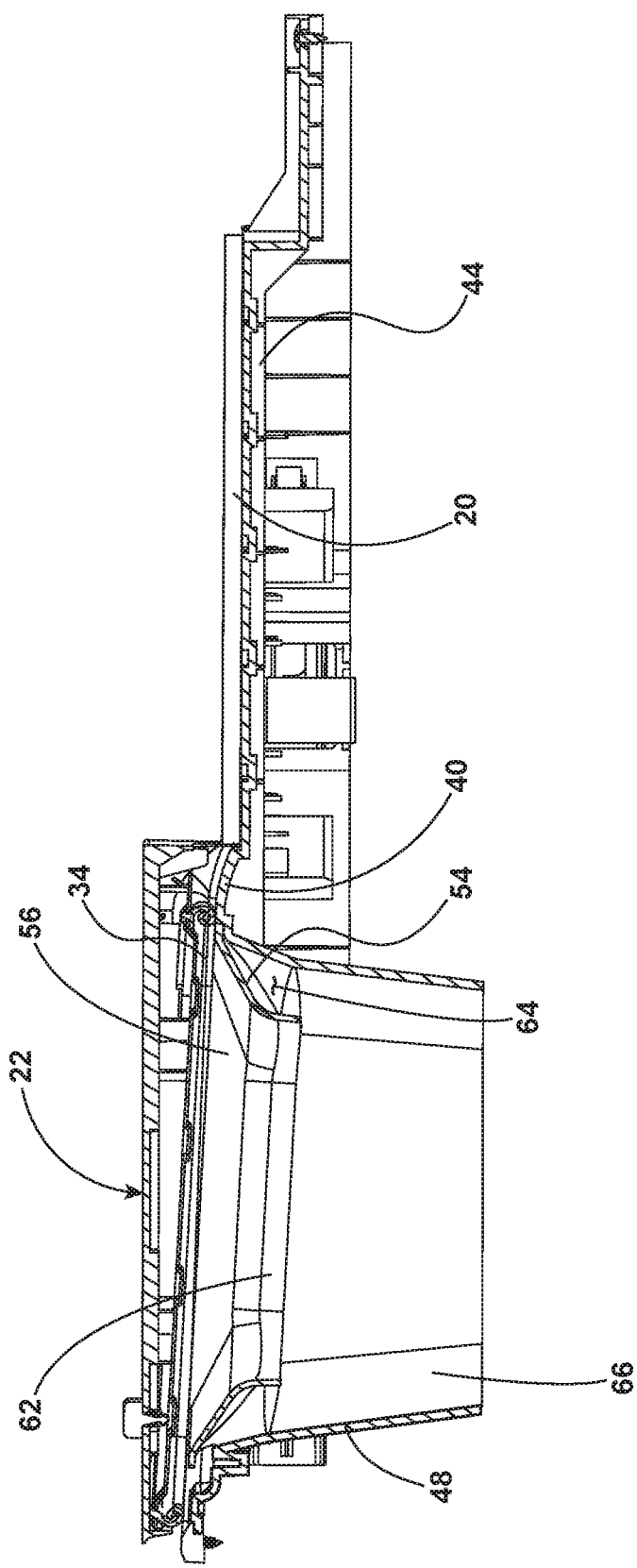
FIG. 5 is a cross-sectional view of the lid assembly of FIG. 3 in a closed position.

FIG. 5 is a cross sectional view of the lid assembly 28 with the trim bezel 54 in place. The geometry of the trim bezel 54 produces a gap 64 between the funnel 48 and the vertical portion 62 of the trim bezel 54 when in place. As food is distributed through the trim bezel opening 60, areas within the gap 64 are protected by the complimentary converging portion 56 of the trim bezel 54. Once food debris has been distributed, it can also be understood that side walls 66 of the funnel 48 remain cleaner than if the trim bezel 54 was not in place due to gravity pulling the food straight down.

While illustrated as two different shape configurations, the funnel 48 and the trim bezel 54 can be complimentary in shape such that the trim bezel 54 completely overlies the funnel portion leaving no gap 64 while still protecting any portions of the funnel 48 below the trim bezel 54.

It can be contemplated that the vertical portion 62 of the trim bezel 54 can extend farther into the funnel 48 to allow for increased coverage of the funnel side walls 66. The trim bezel 54 can also be fully integrated with the funnel 48 in such a way that the entire funnel assembly 46 is removable.

Benefits of a removable trim bezel include protecting the structural funnel below the trim bezel from food debris. While it can be contemplated that the entire lid assembly is removable and washable, the trim bezel allows a user to easily clean the food composter receiving portion more easily than the entire lid assembly. Functionally a dishwasher-safe trim bezel allows for frequent cleaning along with protecting the areas below the trim bezel from food and debris becoming lodged in grooves and edges that are more difficult to clean.

To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. Moreover, while "a set of" various elements have been described, it will be understood that "a set" can include any number of the respective elements, including only one element. Combinations or permutations of features described herein are doored by this disclosure.

This written description uses examples to disclose embodiments of the invention, and also to enable any person skilled in the art to practice embodiments of the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A food composter comprising:
   a housing defining an interior, and having a top wall defining an access opening providing access to the interior;
   a door moveable relative to the access opening between open/closed positions to selectively open/close the access opening;
   a removable trim bezel comprising a converging portion that converges to a vertical portion and having a trim bezel opening aligned with the access opening; and
   a bin located within the interior and having a fill opening in communication with the trim bezel opening.

2. The food composter of claim 1 wherein the access opening further defines a surface upon which the trim bezel is received when in place.

3. The food composter of claim 2 wherein the trim bezel is flush with the surface when in place.

4. The food composter of claim 1 further comprising a lock for locking the door during operation.

5. The food composter of claim 4 further comprising a controller for controlling operation of the food composter.

6. The food composter of claim 5 further comprising a motor.

7. The food composter of claim 6 further comprising a sensor.

8. The food composter of claim 7 further comprising a fan.

9. The food composter of claim 8 wherein the controller is operably coupled to at least one of the lock, the motor, the sensor, or the fan.

10. The food composter of claim 1, wherein the trim bezel is located between the door and the access opening.

11. The food composter of claim 1, wherein the trim bezel is made of dishwasher-safe material.

12. The food composter of claim 11 wherein the dishwasher-safe material can retain its shape after being exposed to temperatures greater than 65° C. for at least 180 minutes.

13. A food composter comprising:
    a housing defining an interior and having an end wall having an access opening providing access to the interior;
    a door moveable relative to the access opening between open/closed positions to selectively open/close the access opening;
    a removable trim bezel having a converging portion that converges to a trim bezel opening aligned with the access opening; and
    a bin located within the interior and having a fill opening in communication with the trim bezel opening.

14. The food composter of claim 13 wherein the access opening further defines a surface upon which the trim bezel is received when in place and the trim bezel is flush with the surface when in place.

15. The food composter of claim 13 further comprising a lock for locking the door during operation.

16. The food composter of claim 15 further comprising a controller for controlling operation of the food composter.

17. The food composter of claim 16 further comprising a motor.

18. The food composter of claim 17 wherein the controller is operably coupled to at least one of the lock or motor.

19. The food composter of claim 13, wherein the trim bezel is made of dishwasher-safe material.

* * * * *